(12) United States Patent
Yoshinaka

(10) Patent No.: US 7,165,588 B2
(45) Date of Patent: Jan. 23, 2007

(54) PNEUMATIC TIRE WITH BAND CORD MODULUS HIGHER IN SIDE PORTION THAN IN CENTER PORTION OF BAND

(75) Inventor: Nobuyoshi Yoshinaka, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 65 days.

(21) Appl. No.: 11/043,958

(22) Filed: Jan. 28, 2005

(65) Prior Publication Data
US 2005/0205189 A1    Sep. 22, 2005

(30) Foreign Application Priority Data
Mar. 22, 2004    (JP) .............................. 2004-081803

(51) Int. Cl.
B60C 9/22    (2006.01)
(52) U.S. Cl. ................. 152/527; 152/531; 152/533
(58) Field of Classification Search ............... 152/531, 152/533, 527
See application file for complete search history.

(56) References Cited

U.S. PATENT DOCUMENTS 5,795,417 A * 8/1998 Damke et al. .......... 152/533 X
6,058,996 A * 5/2000 Suzuki .................... 152/531 X
6,557,605 B1 * 5/2003 Yukawa et al. ............. 152/531
2004/0089392 A1 * 5/2004 Yukawa et al. ............. 152/533
2005/0016654 A1 * 1/2005 Yukawa .................. 152/531 X

FOREIGN PATENT DOCUMENTS

EP    0 422 881 A2    4/1991
WO    WO-02/102610 A1 * 12/2002

* cited by examiner

Primary Examiner—Adrienne C. Johnstone
(74) Attorney, Agent, or Firm—Birch, Stewart, Kolasch & Birch, LLP

(57) ABSTRACT

A band (14) of a tire covers a belt (12). The band (14) is formed by a band ply (36). The band ply (36) includes a side portion (38) and a center portion (40). A band cord having a high modulus (Ms) is used for the side portion (38). Typically, a band cord to be a composite of a nylon fiber and an aramid fiber is used for the side portion (38). A band cord having a low modulus (Mc) is used for the center portion (40). Typically, a nylon fiber is used for the band cord of the center portion (40). A ratio (Ms/Mc) is 2.0 to 4.0. A ratio of a width (Ws) of the side portion (38) to a width (Wb) of the band (14) is 5.0% to 20.0%.

11 Claims, 4 Drawing Sheets

US 7,165,588 B2

PNEUMATIC TIRE WITH BAND CORD MODULUS HIGHER IN SIDE PORTION THAN IN CENTER PORTION OF BAND

This application claims priority on Patent Application No. 2004-081803 filed in JAPAN on Mar. 22, 2004, the entire contents of which are hereby incorporated by reference.

BACKGROUND OF THE INVENTION

1. Field of the Invention

The present invention relates to a pneumatic tire which is mainly attached to a passenger car.

2. Description of the Related Art

A radial tire for high speed running comprises a band between a tread and a belt. The band includes a band cord wound in a circumferential direction. The band cord binds the belt. The lifting of the belt which is caused by a centrifugal force in the high speed straight running is suppressed by the band cord. Japanese Laid-Open Patent Publication No. 2002-137606 has disclosed a band obtained by combining a band cord having a high modulus and a band cord having a low modulus.

A band covering the whole area of the belt sufficiently binds the vicinity of a center in the axial direction of the belt. On the other hand, the band has an insufficient binding force in the vicinity of the edge of the belt. The band does not sufficiently suppress the lifting in the vicinity of the edge. In addition, the insufficient binding force causes a great road noise.

If a cord having a high modulus is used in the band, the vicinity of the edge of the belt is also bound sufficiently. By this band, however, the stiffness of a tire is increased excessively. The excessive stiffness impedes the ride comfort of the tire. The band also causes a great exterior noise. If the modulus of the cord is excessively high, a handling stability is also deteriorated.

It is an object of the present invention to provide a pneumatic tire having an excellent silence and ride comfort.

SUMMARY OF THE INVENTION

A pneumatic tire according to the present invention comprises a tread having an external surface forming a tread surface, a pair of sidewalls extended almost inward in a radial direction from both ends of the tread, a pair of beads extended almost inward in the radial direction from the sidewalls, a carcass laid between both of the beads along insides of the tread and the sidewalls, a belt provided on the carcass at an inside in the radial direction of the tread, and a band positioned between the belt and the tread and covering the belt. A band ply constituting the band is formed by a band cord and a topping rubber. The band ply includes a side portion positioned in the vicinity of an edge of the belt and a center portion positioned in the vicinity of a center in an axial direction. A modulus of the band cord of the side portion is higher than that of the band cord of the center portion. A width Ws of the side portion is 5.0% to 20.0% of a width Wb of the band.

It is preferable that a ratio of the modulus of the band cord of the side portion to that of the band cord of the center portion should be 2.0 to 4.0. It is more preferable that the ratio should be 2.6 to 3.7.

It is preferable that the width Ws of the side portion should be 12.0% to 18.0% of the width Wb of the band.

It is preferable that the modulus of the band cord of the side portion should be 3000 N/mm² to 8000 N/mm². It is suitable that a composite of a nylon fiber and an aramid fiber should be used for the band cord of the side portion.

In the tire, the vicinity of the edge of the belt is bound sufficiently. The tire makes a small road noise. In the tire, a stiffness in the vicinity of the center in the axial direction is not excessively great. The tire also has an excellent ride comfort.

DESCRIPTION OF THE PREFERRED EMBODIMENTS

The present invention will be described below in detail based on preferred embodiments with reference to the drawings.

Figure 1:
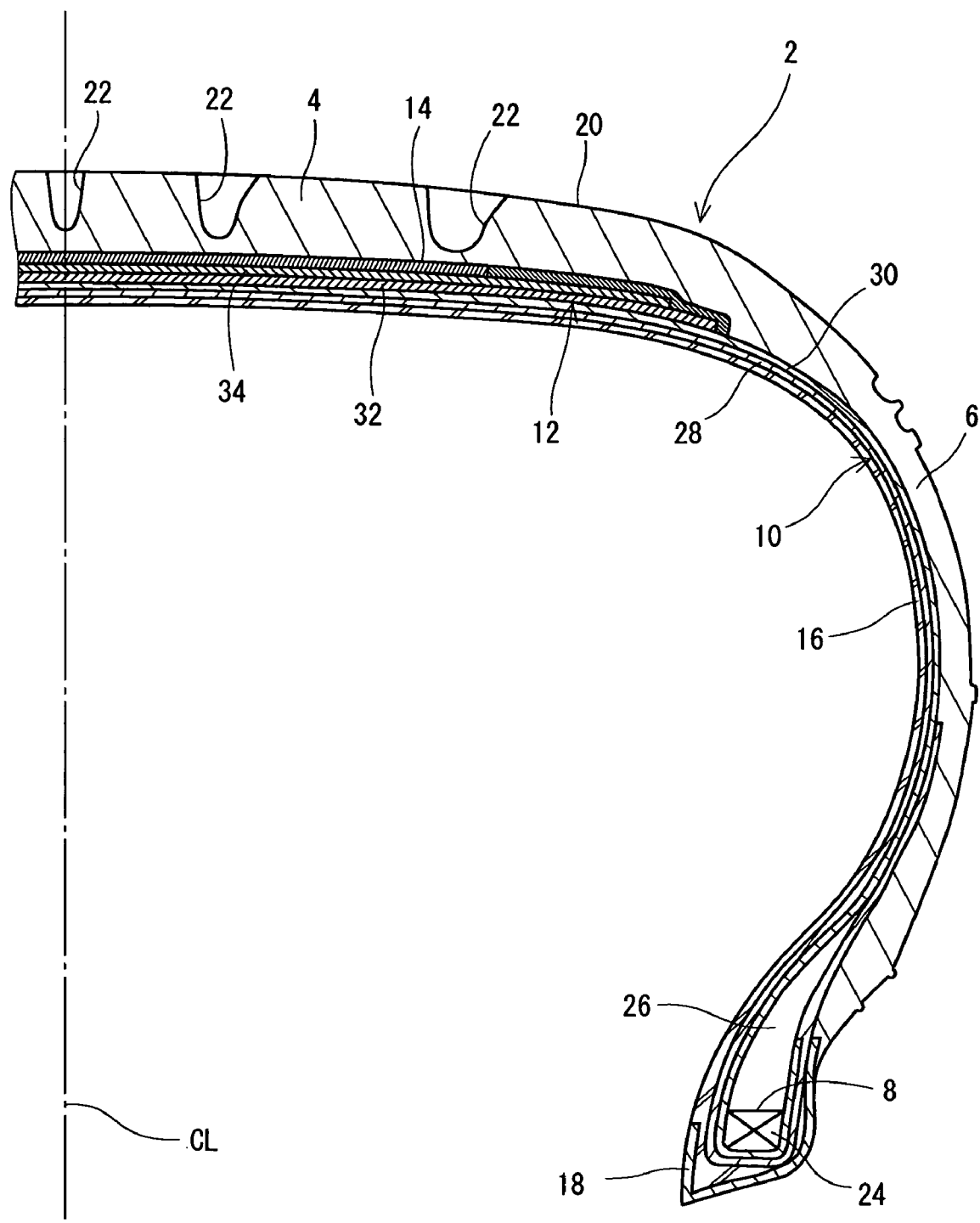
FIG. 1 is a sectional view showing a part of a pneumatic tire according to an embodiment of the present invention.

In FIG. 1, a vertical direction is set to be a radial direction of a tire 2, a transverse direction is set to be an axial direction of the tire 2, and a perpendicular direction to a paper is set to be a circumferential direction of the tire 2. The tire 2 takes an almost symmetrical shape about a one-dotted chain line CL in FIG. 1. The tire 2 comprises a tread 4, a sidewall 6, a bead 8, a carcass 10, a belt 12, a band 14, an inner liner 16 and a chafer 18.

The tread 4 is formed by a crosslinked rubber and takes the shape of an outward convex in the radial direction. The tread 4 forms a tread surface 20 to come in contact with a road surface. A groove 22 is provided on the tread surface 20. A tread pattern is formed by the grooves 22.

The sidewall 6 is extended almost inward in the radial direction from the end of the tread 4. The sidewall 6 is formed by a crosslinked rubber. The sidewall 6 absorbs a shock from the road surface by a flexure. Moreover, the sidewall 6 prevents the external damage of the carcass 10.

The bead 8 is extended almost inward in the radial direction from the inside end of the sidewall 6. The bead 8 is constituted by a core 24 and an apex 26 extended outward in the radial direction from the core 24. The core 24 is ring-shaped and includes a plurality of non-extensible wires (typically, wires formed of steel). The apex 26 is outward tapered in the radial direction and is formed by a crosslinked rubber having a high hardness.

The carcass 10 is constituted by a first carcass ply 28 and a second carcass ply 30. The first carcass ply 28 and the second carcass ply 30 are laid between the beads 8 on both sides along the insides of the tread 4 and the sidewall 6. The first carcass ply 28 and the second carcass ply 30 are wound from an inside toward an outside in the axial direction around the core 24.

The first carcass ply 28 and the second carcass ply 30 are constituted by a carcass cord and a topping rubber, which is not shown. The absolute value of an angle formed by the carcass cord in the circumferential direction is usually 75 to 90 degrees. In other words, the tire 2 is a radial tire. An organic fiber is usually used for the carcass cord. Examples of a preferable organic fiber include a polyester fiber, a nylon fiber, a rayon fiber, a polyethylene naphthalate fiber (PEN) and an aramid fiber.

The belt 12 is positioned on an outside in the radial direction of the carcass 10. The belt 12 is provided on the carcass 10. The belt 12 reinforces the carcass 10. The belt 12 is constituted by an inner belt ply 32 and an outer belt ply 34. Each of the inner belt ply 32 and the outer belt ply 34 is constituted by a belt cord and a topping rubber, which is not shown. The belt cord is inclined to the circumferential direction. The direction of inclination to the circumferential direction of the belt cord of the inner belt ply 32 is reverse to the direction of inclination to the circumferential direction of the belt cord of the outer belt ply 34. The preferable material of the belt cord is steel. An organic fiber may be used for the belt cord.

The inner liner 16 is bonded to the inner peripheral surface of the carcass 10. The inner liner 16 is formed by a crosslinked rubber. A rubber having a small air transmittance is used for the inner liner 16. The inner liner 16 plays a part in holding the internal pressure of the tire 2.

The chafer 18 is positioned in the vicinity of the bead 8. When the tire 2 is incorporated in a rim, the chafer 18 abuts on the rim. By the abutment, the vicinity of the bead 8 is protected. The chafer 18 is usually constituted by a cloth and a rubber impregnated into the cloth. It is also possible to use the chafer 18 formed by a single rubber.

Figure 2:
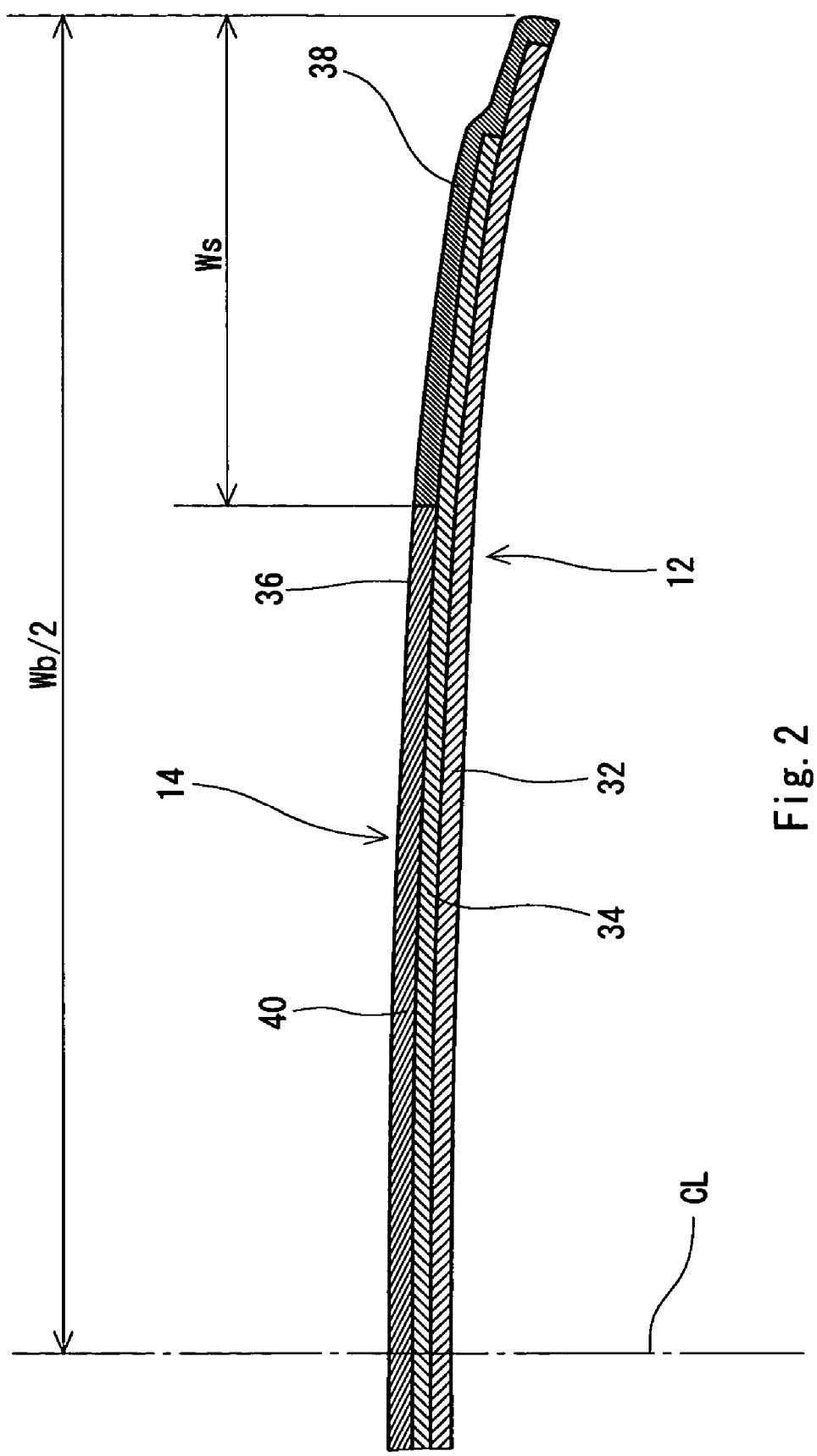
FIG. 2 is an enlarged sectional view showing a part of a belt and a band in the tire illustrated in FIG. 1.

FIG. 2 is an enlarged sectional view showing a part of the belt 12 and the band 14 of the tire 2 in FIG. 1. The band 14 is constituted by a band ply 36. The band ply 36 covers the whole belt 12. The band ply 36 is a so-called full ply. The band ply 36 includes a side portion 38 and a center portion 40. The side portion 38 is positioned in the vicinity of the edge of the belt 12. The center portion 40 is positioned in the vicinity of a center in the axial direction of the tire 2.

Figure 3:
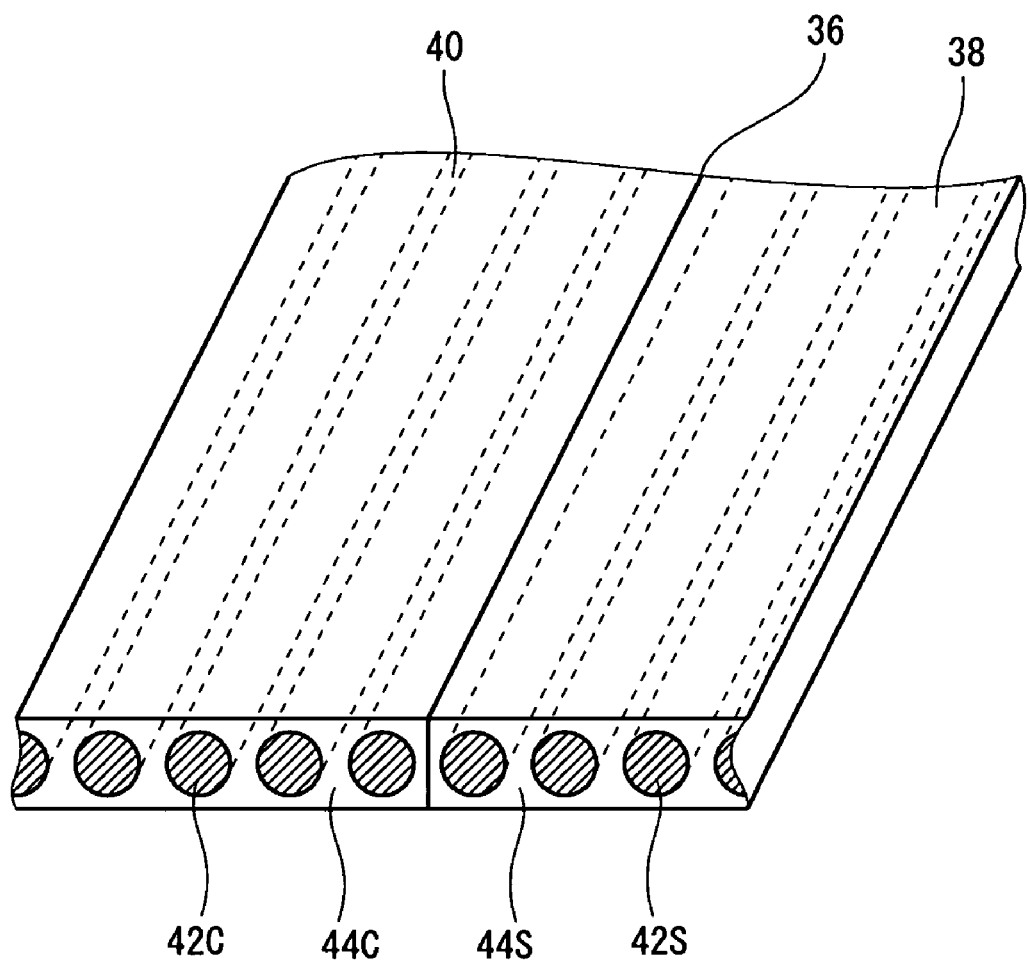
FIG. 3 is an enlarged exploded perspective view showing an outer belt ply, and a side portion and a center portion in the band of FIG. 2.

FIG. 3 is an enlarged exploded perspective view showing the side portion 38 and the center portion 40 of the band ply 36 in FIG. 2. In FIG. 3, an X direction indicates the axial direction, a Y direction indicates the circumferential direction, and a Z direction indicates the radial direction.

The side portion 38 is constituted by a band cord 42S and a topping rubber 44S. The band cord 42S is wound spirally. The band cord 42S is exactly jointless. The band cord 42S is extended substantially in the circumferential direction. As described above, the band cord 42S is wound spirally. Therefore, the band cord 42S is strictly inclined slightly to the circumferential direction. The absolute value of an angle formed by the band cord 42S in the circumferential direction is smaller than 2.0 degrees. In the present invention, a direction in which the absolute value of an angle in the circumferential direction is smaller than 2.0 degrees is set to be a "substantial circumferential direction".

The band cord 42S having a high modulus Ms is used in the side portion 38. Accordingly, the binding force of the side portion 38 to the vicinity of the edge of the belt 12 is great. By the great binding force, a road noise is suppressed. In particular, a noise having a frequency in a middle range is suppressed. The tire 2 has an excellent silence.

The center portion 40 is constituted by a band cord 42C and a topping rubber 44C. The band cord 42C is wound spirally. The band cord 42C is exactly Pointless. The band cord 42C is also extended substantially in the circumferential direction in the same manner as the band cord 42S of the side portion 38.

The band cord 42C having a low modulus Mc is used in the center portion 40. Accordingly, the binding force of the center portion 40 to the vicinity of the center of the belt 12 is comparatively small. The stiffness of the vicinity of the center of the tire 2 including the center portion 40 is comparatively small. The tire 2 has an excellent ride comfort. The band cord 42C having the low modulus Mc also contributes to a reduction in an exterior noise and a decrease in a rolling resistance.

In respect of the compatibility of the silence obtained by the side portion 38 with the ride comfort obtained by the center portion 40, it is preferable that a ratio (Ms/Mc) of the modulus Ms of the band cord 42S to the modulus Mc of the band cord 42C should be 2.0 to 4.0. The ratio (Ms/Mc) is more preferably 2.3 and is particularly preferably equal to or higher than 2.6. The ratio (Ms/Mc) is more preferably equal to or lower than 3.8 and is particularly preferably equal to or lower than 3.7. In the present invention, the ratio (Ms/Mc) is calculated based on the moduli Ms and Mc obtained when an elongation percentage is 2%. The moduli Ms and Mc are measured in accordance with the rules of "JIS L 1017".

In respect of a reduction in the road noise, the modulus Ms of the band cord 42S of the side portion 38 is preferably equal to or higher than 3000 N/mm$^2$ and is more preferably equal to or higher than 5000 N/mm$^2$. If the modulus Ms is excessively high, a handling stability is impeded, and furthermore, a rolling resistance is increased. From this viewpoint, the modulus Ms is preferably equal to or lower than 8000 N/mm$^2$, is more preferably equal to or lower than 7500 N/mm$^2$, and is particularly preferably equal to or lower than 7000 N/mm$^2$.

An organic fiber can be suitably used for the band cord 42S. Examples of the preferable material of the band cord 42S include a polyethylene naphthalate (PEN) fiber and an aramid fiber. The composite of a nylon fiber and the aramid fiber may be used for the band cord 42S. The composite contributes to a reduction in a road noise, an enhancement in a handling stability and a decrease in a rolling resistance. The ratio of the weights of the nylon fiber and the aramid fiber in the composite is preferably 1/4 to 4/1 and more preferably 2/3 to 3/2.

In respect of an enhancement in a ride comfort, a reduction in an exterior noise and a decrease in a rolling resistance, the modulus Mc of the band cord 42C in the center portion 40 is preferably equal to or lower than 2500 N/mm$^2$ and is more preferably equal to or lower than 2200 N/mm$^2$. If the modulus Mc is excessively low, the durability of the tire 2 becomes insufficient. From this viewpoint, the modulus Mc is preferably equal to or higher than 1000 N/mm$^2$ and is more preferably equal to or higher than 1500 N/mm$^2$.

An organic fiber can be suitably used for the band cord 42C. Typically, a nylon fiber is used for the band cord 42C. A polyester fiber or a vinylon fiber may be used for the band cord 42C.

It is preferable that the densities of the band cords 42S and 42C in the band ply 36 should be 5 ends/cm to 20 ends/cm. It is preferable that the sectional areas of the band cords 42S and 42C in the band ply 36 should be 0.10 mm$^2$ to 1.6 mm$^2$.

In FIG. 2, an arrow Ws indicates the width of the side portion 38 and an arrow Wb/2 indicates a half of the width of the band 14. It is preferable that a ratio of the width Ws of the side portion 38 to the width Wb of the band 14 should be 5.0% to 20.0%. In some cases in which the ratio is lower than the range, the road noise cannot be suppressed sufficiently. From this viewpoint, the ratio is more preferably equal to or higher than 12% and is particularly preferably equal to or higher than 15%. In some cases in which the ratio exceeds the range, the ride comfort becomes insufficient and the rolling resistance is increased, and furthermore, the exterior noise is increased. From this viewpoint, the ratio is more preferably equal to or lower than 19% and is particularly preferably equal to or lower than 18%.

The tire may comprise two full plies or more. In this case, a side portion and a center portion are provided in at least one full ply.

In the present invention, the dimension of each portion of the tire 2 is measured in a state in which the tire 2 is incorporated in a normal rim and air is filled to obtain a normal internal pressure. In this specification, the normal rim implies a rim determined in rules on which the tire 2 depends. A "standard rim" in the JATMA rules, a "Design Rim" in the TRA rules and a "Measuring Rim" in the ETRTO rules are included in the normal rim. In this specification, the normal internal pressure implies an internal pressure determined in the rules on which the tire 2 depends. A "maximum air pressure" in the JATMA rules, a "maximum value" described in "TIRE LOAD LIMITS AT VARIOUS COLD INFLATION PRESSURES" in the TRA rules and an "INFLATION PRESSURE" in the ETRTO rules are included in the normal internal pressure. The normal internal pressure of a tire for a car in accordance with the JATMA rules is 180 kPa.

Figure 4:
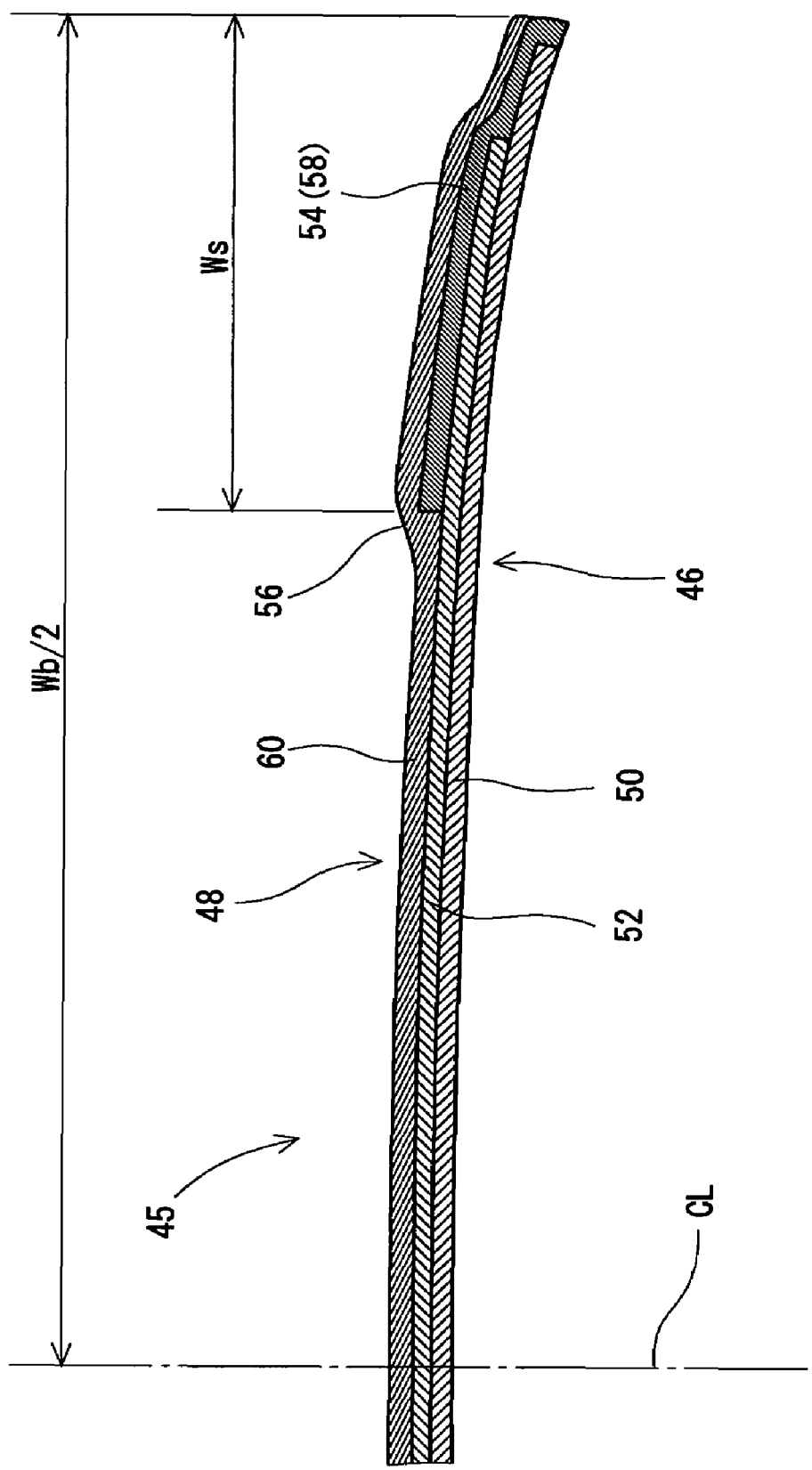
FIG. 4 is a sectional view showing a part of a pneumatic tire according to another embodiment of the present invention.

FIG. 4 is a sectional view showing a part of a pneumatic tire 45 according to another embodiment of the present invention. FIG. 4 shows a belt 46 and a band 48. The belt 46 is formed by an inner belt ply 50 and an outer belt ply 52. The tire 45 comprises the same tread, sidewall, bead, carcass, inner liner and chafer as those in the tire 2 of FIG. 1, which is not shown.

As shown in FIG. 4, the band 48 is formed by an edge ply 54 and a full ply 56. In the tire 45, the edge ply 54 constitutes a side portion 58. A portion of the full ply 56 which does not overlap with the side portion 58 constitutes a center portion 60. The side portion 58 is positioned in the vicinity of the edge of the belt 46. The center portion 60 is positioned in the vicinity of a center in the axial direction of the tire 45.

The side portion 58 and the center portion 60 are formed by a band cord and a topping rubber, which is not shown. The band cord is wound spirally. The band cord is exactly jointless. The band cord is extended substantially in a circumferential direction.

A band cord having a high modulus Ms is used in the side portion 58. Accordingly, the binding force of the side portion 58 to the vicinity of the edge of the belt 46 is great. By the great binding force, a road noise is suppressed. In particular, a noise having a frequency in a middle range is suppressed. The tire 45 has an excellent silence.

A band cord having a low modulus Mc is used in the center portion 60. Accordingly, the binding force of the center portion 60 to the vicinity of the center of the belt 46 is comparatively small. The stiffness of the vicinity of the center of the tire 45 including the center portion 60 is comparatively small. The tire 45 has an excellent ride comfort. The band cord having the low modulus Mc also contributes to a reduction in an exterior noise and a decrease in a rolling resistance.

In respect of the compatibility of the silence obtained by the side portion 58 with the ride comfort obtained by the center portion 60, it is preferable that a ratio (Ms/Mc) of the modulus Ms to the modulus Mc should be 2.0 to 4.0. The ratio (Ms/Mc) is more preferably 2.3 and is particularly preferably equal to or greater than 2.6. The ratio (Ms/Mc) is more preferably equal to or lower than 3.8 and is particularly preferably equal to or lower than 3.7.

In respect of a reduction in the road noise, the modulus Ms of the band cord of the side portion 58 is preferably equal to or higher than 3000 N/mm$^2$ and is more preferably equal to or higher than 5000 N/mm$^2$. If the modulus Ms is excessively high, a handling stability is impeded, and furthermore, a rolling resistance is increased. From this viewpoint, the modulus Ms is preferably equal to or lower than 8000 N/mm$^2$, is more preferably equal to or lower than 7500 N/mm$^2$, and is particularly preferably equal to or lower than 7000 N/mm$^2$.

An organic fiber can be suitably used for the band cord of the side portion 58. Examples of the preferable organic fiber include a polyethylene naphthalate fiber and an aramid fiber. The composite of a nylon fiber and the aramid fiber may be used for the band cord of the side portion 58. The composite contributes to a reduction in a road noise, an enhancement in a handling stability and a decrease in a rolling resistance. The ratio of the weights of the nylon fiber and the aramid fiber in the composite is preferably 1/4 to 4/1 and more preferably 2/3 to 3/2.

In respect of an enhancement in a ride comfort, a reduction in an exterior noise and a decrease in a rolling resistance, the modulus Mc of the band cord of the center portion 60 is preferably equal to or lower than 2500 N/mm$^2$ and is more preferably equal to or lower than 2200 N/mm$^2$. If the modulus Mc is excessively low, the durability of the tire 45 becomes insufficient. From this viewpoint, the modulus Mc is preferably equal to or higher than 1000 N/mm$^2$ and is more preferably equal to or higher than 1500 N/mm$^2$.

An organic fiber can be suitably used for the band cord of the center portion 60. Typically, a nylon fiber is used. A polyester fiber or a vinylon fiber may be used for a band cord 42C of the center portion 60.

It is preferable that the densities of the band cords in the edge ply 54 and the full ply 56 should be 5 ends/cm to 20 ends/cm. It is preferable that the sectional areas of the band cords in the edge ply 54 and the full ply 56 should be 0.10 mm$^2$ to 1.6 mm$^2$.

It is preferable that a ratio of a width Ws of the side portion 58 to a width Wb of the band 48 should be 5.0% to 20.0%. In some cases in which the ratio is lower than the range, the road noise cannot be suppressed sufficiently. From this viewpoint, the ratio is more preferably equal to or higher than 12% and is particularly preferably equal to or higher than 15%. In some cases in which the ratio exceeds the range, the ride comfort becomes insufficient and the rolling resistance is increased, and furthermore, the exterior noise is increased. From this viewpoint, it is more preferable that the ratio should be equal to or lower than 18%.

The tire may comprise two or more edge plies in each of edges on left and right sides. In this case, at least one edge ply having a higher modulus Ms than the modulus Mc of the band cord of the center portion is provided in each of the edges on the left and right sides.

EXAMPLES

Example 1

A pneumatic tire for a passenger car which has a structure shown in FIGS. 1 to 3 was obtained. The details of the band of the tire are shown in the following Table 1. In the tire, an angle in a circumferential direction which is formed by the belt cord of an inner belt ply is +24 degrees and an angle in the circumferential direction which is formed by the belt cord of an outer belt ply is −24 degrees. The tire has a size of "215/60R16 95H".

Examples 2 to 8 and Comparative Examples 1 to 4

A tire according to each of examples 2 to 12 and comparative examples 1 to 4 was obtained in the same manner as in the example 1 except that the specifications of a band were set as shown in the following Tables 1 and 2.

[Measurement of Noise]

A tire was incorporated in a rim of "16×6.5-JJ" and the internal pressure of the tire was set to be 230 kPa. The tire was attached to a passenger car with front side engine and front wheel drive which has a engine displacement of 2300 cm$^3$. The car was caused to run at a speed of 50 km/h over an asphalt road surface having a high roughness. A volume (an overall value) in the right ear of a driver and an exterior volume in the running were measured. Based on the comparative example 1, an evaluation was carried out. Referring to the examples 1 to 12 and the comparative examples 2 to 4, a value was calculated by subtracting a volume according to the comparative example 1 from each of volumes. This result is shown in the following Tables 1 and 2.

[Sensory Evaluation]

The driver of the car was caused to evaluate a handling stability and a ride comfort at a maximum of 10 points. This result is shown in the following Tables 1 and 2.

[Measurement of Rolling Resistance]

The tire was attached to a rolling resistance testing machine. A load of 4400 N was applied to the tire and a rolling resistance was measured at a speed of 80 km/h. This result is shown in the following Tables 1 and 2 as an index in the case in which a rolling resistance according to the comparative example 1 is set to be 100.

As shown in the Tables 1 and 2, the tire according to each of the examples is excellent in all of a silence, a rolling resistance, a handling stability and a ride comfort. From the results of the evaluation, the advantages of the present invention are apparent.

The above description is only illustrative and various changes can be made without departing from the scope of the present invention.

What is claimed is:

1. A pneumatic tire comprising a tread having an external surface forming a tread surface, a pair of sidewalls extended almost inward in a radial direction from both ends of the tread, a pair of beads extended almost inward in the radial direction from the sidewalls, a carcass laid between both of the beads along insides of the tread and the sidewalls, a belt provided on the carcass at an inside in the radial direction of the tread, and a band positioned between the belt and the tread and covering the belt, wherein a band ply constituting the band is formed by a band cord and a topping rubber, the band ply is spirally wound in a circumferential direction, the band ply includes a side portion positioned in the vicinity of an edge of the belt and a center portion positioned in the vicinity of a center in an axial direction, a modulus of the band cord of the side portion is lower than 8000 N/mm$^2$ and is higher than that of the band cord of the center portion, and

TABLE 1

Result of Evaluation

| | | Compara. example 1 | Compara. example 2 | Compara. example 3 | Example 1 | Example 2 | Example 3 | Example 4 | Example 5 | Compara. example 4 |
|---|---|---|---|---|---|---|---|---|---|---|
| Side portion | Material | Nylon | PEN | PEN | PEN | PEN | PEN | PEN | PEN | PEN |
| | Modulus Ms (N/mm$^2$) | 1950 | 12590 | 12590 | 12590 | 12590 | 12590 | 12590 | 12590 | 12590 |
| | Width Ws (mm) | 35.0 | 35.0 | 35.0 | 30.0 | 25.0 | 20.0 | 15.0 | 10.0 | 5.0 |
| Center portion | Material | Nylon | Nylon | PEN | Nylon | Nylon | Nylon | Nylon | Nylon | Nylon |
| | Modulus Mc (N/mm$^2$) | 1950 | 1950 | 12590 | 1950 | 1950 | 1950 | 1950 | 1950 | 1950 |
| | Width Wb-Ws · 2 (mm) | 100.0 | 100.0 | 100.0 | 110.0 | 120.0 | 130.0 | 140.0 | 150.0 | 160.0 |
| Ratio Ms/Mc | | 1.00 | 6.46 | 1.00 | 6.46 | 6.46 | 6.46 | 6.46 | 6.46 | 6.46 |
| (Ws/Wb) · 100 (%) | | 20.6 | 20.6 | 20.6 | 17.6 | 14.7 | 11.8 | 8.8 | 5.9 | 2.9 |
| Road noise (dB(A)) | | base | −1.9 | −2.0 | −1.8 | −1.7 | −1.7 | −1.5 | −1.5 | −0.8 |
| Exterior noise (dB(A)) | | base | +0.5 | +1.2 | +0.3 | +0.2 | ±0 | ±0 | ±0 | ±0 |
| Rolling resistance (index) | | 100 | 103 | 110 | 101 | 101 | 100 | 100 | 100 | 100 |
| Handling stability (index) | | 6 | 7 | 7 | 7 | 7 | 7 | 7 | 6 | 6 |
| Ride comfort (index) | | 6 | 5 | 4 | 6 | 6 | 6 | 6 | 6 | 6 |

TABLE 2

Result of Evaluation

| | | Example 6 | Example 7 | Example 8 | Example 9 | Example 10 | Example 11 | Example 12 |
|---|---|---|---|---|---|---|---|---|
| Side portion | Material | Composite | Composite | Composite | Nylon | Composite | Composite | Composite |
| | Modulus Ms (N/mm$^2$) | 6900 | 6200 | 5400 | 3230 | 7600 | 8200 | 9000 |
| | Width Ws (mm) | 30 | 30 | 30 | 30 | 30 | 30 | 30 |
| Center portion | Material | Nylon | Nylon | Nylon | Nylon | Nylon | Nylon | Nylon |
| | Modulus Mc (N/mm$^2$) | 1950 | 1950 | 1950 | 1950 | 1950 | 1950 | 1950 |
| | Width Wb-Ws · 2 (mm) | 110.0 | 110.0 | 110.0 | 110.0 | 110.0 | 110.0 | 110.0 |
| Ratio Ms/Mc | | 3.54 | 3.18 | 2.77 | 1.66 | 3.90 | 4.21 | 4.62 |
| (Ws/Wb) · 100 (%) | | 17.6 | 17.6 | 17.6 | 17.6 | 17.6 | 17.6 | 17.6 |
| Road noise (dB(A)) | | −1.7 | −1.6 | −1.6 | −0.5 | −1.7 | −1.7 | −1.7 |
| Exterior noise (dB(A)) | | ±0 | −0.1 | −0.2 | −0.1 | +0.1 | +0.3 | +0.3 |
| Rolling resistance (index) | | 100 | 99 | 98 | 99 | 100 | 100 | 101 |
| Handling stability (index) | | 7 | 7 | 7 | 6 | 7 | 7 | 7 |
| Ride comfort (index) | | 6 | 7 | 7 | 6 | 6 | 6 | 6 | a width Ws of the side portion is 5.0% to 20.0% of a width Wb of the band.

2. The tire according to claim 1, wherein a ratio of the modulus of the band cord of the side portion to that of the band cord of the center portion is 2.0 to 4.0.

3. The tire according to claim 1, wherein the width Ws of the side portion is 12.0% to 18.0% of the width Wb of the band.

4. The tire according to claim 1, wherein the modulus of the band cord of the side portion is 2.6 to 3.7 times as high as that of the band cord of the center portion.

5. The tire according to claim 1, wherein the modulus of the band cord of the side portion is 3000 N/mm2 to lower than 8000 N/mm$^2$.

6. The tire according to claim 5, wherein a composite of a nylon fiber and an aramid fiber is used for the band cord of the side portion.

7. The tire according to claim 1, wherein the modulus of the band cord of the side portion is equal to or lower than 7600 N/mm$^2$.

8. The tire according to claim 1, wherein the modulus of the band cord of the side portion is 3000 N/mm$^2$ to 7500 N/mm$^2$.

9. The tire according to claim 1, wherein the modulus of the band cord of the side portion is 5000 N/mm$^2$ to 7000 N/mm$^2$.

10. The tire according to claim 1, wherein the modulus of the band cord of the center portion is 1000 N/mm$^2$ to 2500 N/mm$^2$.

11. The tire according to claim 1, wherein the modulus of the band cord of the center portion is 1500 N/mm$^2$ to 2200 N/mm$^2$.

* * * * *